United States Patent [19]
Addison

[11] 3,849,295
[45] Nov. 19, 1974

[54] CATALYST REMOVAL IN MOVING BED PROCESSES

[75] Inventor: George E. Addison, Mt. Prospect, Ill.

[73] Assignee: Universal Oil Products Company, Des Moines, Ill.

[22] Filed: Aug. 23, 1972

[21] Appl. No.: 283,000

[52] U.S. Cl. .................. 208/166, 208/150, 208/151
[51] Int. Cl. ............................................. C10g 11/16
[58] Field of Search ............ 252/414; 208/165, 166, 208/150, 151

[56] References Cited
UNITED STATES PATENTS

| | | | |
|---|---|---|---|
| 2,429,359 | 10/1947 | Kassel | 208/165 |
| 2,846,370 | 8/1958 | Halik et al. | 208/165 |
| 2,893,945 | 7/1959 | Berg | 208/165 |
| 2,903,420 | 9/1959 | Wilki | 208/165 |
| 2,951,036 | 8/1960 | Bodkin et al. | 252/414 |
| 3,505,206 | 4/1970 | Decker | 252/414 |
| 3,505,207 | 4/1970 | Haney et al. | 252/414 |
| 3,591,522 | 7/1971 | Cosyns et al. | 252/414 |
| 3,647,680 | 3/1972 | Greenwood et al. | 208/165 |

Primary Examiner—Herbert Levine
Attorney, Agent, or Firm—James R. Hoatson, Jr.; Robert W. Erickson; William H. Page II

[57] ABSTRACT

Removal of catalyst from moving bed reactor systems having poor catalyst flow due to liquid reactants or catalyst agglomeration problems is facilitated by washing the heavy hydrocarbon from the catalyst with a light, volatile hydrocarbon flush stream or a stripping gas passed over the catalyst while it is in a separation zone located within the reaction vessel or a lock hopper below the reactor. Emphasis is directed to the catalyst removal problems and safety hazards connected with heavy oil hydroprocessing operations.

2 Claims, 1 Drawing Figure

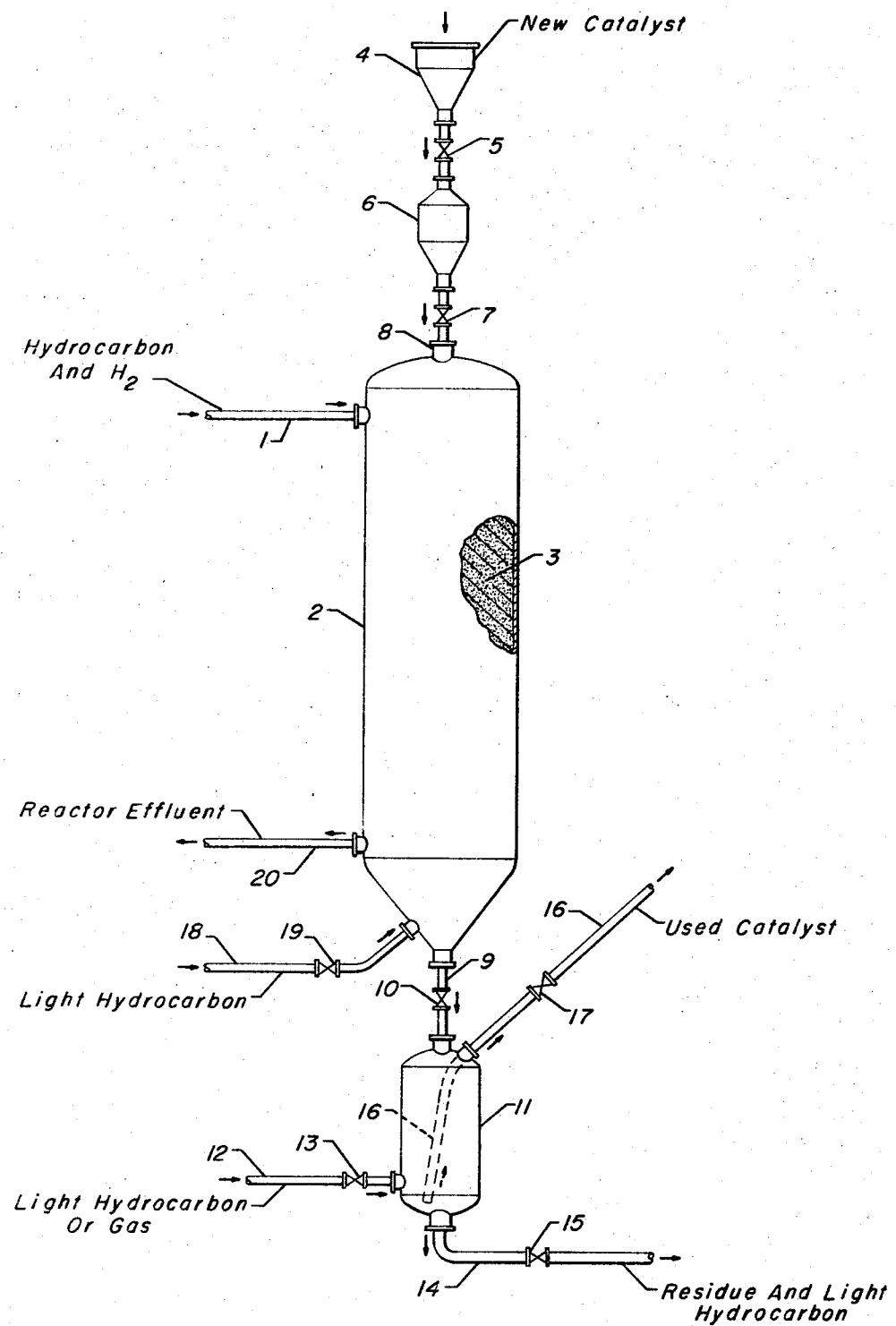

CATALYST REMOVAL IN MOVING BED PROCESSES

BACKGROUND OF THE INVENTION

1. Field of the Invention

The invention pertains to the removal of catalyst from non-fluidized moving bed systems having reactants present in the liquid state. The invention is specifically directed to the removal of catalyst from a heavy oil hydroprocessing reactor to which catalyst is intermittently added and withdrawn in discreet quantities. A light flush hydrocarbon is used to remove the heavy oil in a separation zone, and the catalyst is then dried to a free flowing state.

2. Description of the Prior Art

Mixed phase hydroprocessing techniques and catalysts are well developed in the prior art.

The prior art, however, uses fixed beds of catalyst with periodic regeneration of the entire catalyst bed in the reactor or periodic replacement of the entire catalyst bed. Therefore, since the free flow of the catalyst from a reactor in which the heavy hydrocarbon is present as a liquid has not been required, the problem to which this invention is directed has not been present or treated in the prior art.

The use of a moving bed system in reforming a light naphtha in the vapor phase is described in U.S. Pat. No. 3,470,090 and U.S. Pat. No. 3,647,680.

SUMMARY OF THE INVENTION

Catalyst used in processing a heavy hydrocarbon is unavoidably coated with an inherent residue of the heavy hydrocarbon when it is withdrawn from an operating reaction zone. This residue hinders attempts to hydraulically transport the catalyst and retards the flow of catalyst through and out of the reactor. The residue also increases the amount of material which must be burned off the catalyst in the regeneration procedure, thereby increasing the difficulty of controlling the regeneration zone temperature. Hot oil covered catalyst with high metal and sulfur contents present severe fire and explosion hazards after removal from a reactor. The problems are solved by flushing the heavy liquid hydrocarbon from the catalyst with a light hydrocarbon or stripping gas in a separation stage located in the reactor or just after the withdrawal point from the reactor. The light hydrocarbon is removed by drying with a gas stream and a free flowing catalyst results.

DESCRIPTION OF THE DRAWING

One preferred embodiment of the invention is shown in the drawing where in a hydroprocessing operation a heavy hydrocarbon and hydrogen are admitted by line 1 to reaction vessel 2 which encloses the reaction zone 3 from which, after processing, the reactor effluent material is withdrawn through line 20. This hydrocarbon flow is a continuous operation independent of the intermittent flow of catalyst through the reaction zone. Fresh or regenerated catalyst enters the system through line 4 and valve 5 which lead to pressure equalization lock hopper 6. Valves 5 and 7 provide means to isolate lock hopper 6 from reaction zone 3 and line 4 to prevent the flow of hydrocarbon material from the reaction zone out through line 4. The design of the lock hopper is not germane to the process of the invention and it may be of any construction that affords the introduction and removal of catalyst without upsetting the process. At preselected times, small amounts of catalyst contained in the lock hopper pass through valve 7 in line 8 and eventually through reaction zone 3 to exit the system as used catalyst through line 9 and valve 10. Equal quantities of catalyst are intermittently withdrawn into separation vessel 11 with the unavoidable simultaneous withdrawal of a portion of hydrocarbon liquid from the reaction zone. Valve 10 is then closed to isolate th separation zone from the reaction zone and a flush material is passed through the separation zone. Flush material enters through line 12 and exits by line 14, with its flow being controlled by valves 13 and 15. If the lock hopper is not raised to the pressure of the reactor prior to the opening of valve 10, catalyst and heavy oil will be forced up lift tube 16. In order to wash this tube internally, and any catalyst within it, the light hydrocarbon should be fed to the separation zone through the lift tube. After the heavy hydrocarbon material has been removed from the catalyst, the flow of the flush material is stopped and a stream of dry gas may be passed through the separation zone to remove the flush material from the catalyst. The dry and free flowing catalyst material formed in this manner can then be hydraulically pressured out of the separation zone through lift tube 16 and valve 17 to a regeneration zone.

This simplistic drawing and description of the process of the invention are not meant to limit the application or operation of the process. The washing of the hydrocarbon material from the catalyst may alternatively be performed in a zone contained in the reaction vessel immediately below the reaction zone by back flushing or in a lock hopper further separated from the reaction zone by additional values. Line 18 is shown as a means whereby a flow of light hydrocarbon or stripping gas controlled by valve 19 could be injected into reaction vessel 2 to flush the catalyst prior to its withdrawal from the reaction vessel. Subsequent drying or purging steps may be performed in vessels other than the separation zone. In the interest of clarity and simplicity, many valves, controls, and other pieces of equipment as it is readily apparent to those skilled in the art are required, have not been shown in this drawing.

DETAILED DESCRIPTION OF THE INVENTION

Although this discussion is devoted to hydroprocessing, the process of this invention is applicable to hydrocarbon conversion processes in general. By this term is meant such processes as alkylation, isomerization, condensation, and polymerization, but the invention is limited to those instances where liquid reactants are present, or a residue of soluble reactants accumulates on the catalyst sufficient to hinder the flow of the catalyst as compared to its flow in the dry state. The invention and its possible variations are herein described based on a specific example of its use in the preferred embodiment of heavy oil processing.

Processing hydrocarbons by their passage with hydrogen over beds of catalyst is well described in the prior art. Specific examples include U.S. Pat. No. 2,767,121 which teaches the manner in which a naphtha boiling range charge stock is treated for sulfur and nitrogen removal and saturation of olefins in preparation of charged stock for a catalytic reforming unit. In U.S. Pat. No. 2,717,857 a process for the desulfurization of gas oil fractions (material boiling over 400°F., the normal endpoint for gasoline) is discussed. Heavy oil hydrotreating processes and techniques are described also in U.S. Pat. Nos. 3,501,396, 3,471,397, 3,371,029, 3,470,086, 3,375,189, and 3,429,801. A catalyst especially useful for the hydrorefining of heavy oil is described, along with a process using the catalyst, in U.S. Pat No. 3,525,684.

Processes for the purposes outlined above have traditionally been performed using a fixed bed of catalyst contained in one or more reaction vessels. This procedure has inherent disadvantages to operation which are overcome by the use of moving beds. As the catalyst in a fixed bed system ages, its activity gradually decreases sufficiently to cause a continued lessening in the quality of the product unless the reaction conditions are modified. Secondly, when it is no longer possible to maintain adequate product quality, the catalyst must be replaced while processing is either switched to another reactor or while the process is not operating. The catalytic desulfurization of residual oils, fuel oils and oils produced from shale or coal is complicated by fouling of the catalyst by coke, metals removed from the oil, salt, scale, particulate pieces of coal, sand or rock, and other plant trash. In addition to reducing the activity of the catalyst, deposits of such material increase the pressure drop in the reactor resulting in higher operating expenses and interfere with the uniform distribution of hydrogen and oil across the catalyst, thereby causing channelling, hot spots, and further catalyst deactivation. Shut downs due to these problems are very costly due to the loss of production and catalyst replacement expense. A technique resorted to in heavy oil processing to avoid total shut downs, consists of operating two or more reactors in series or parallel with only one of the reactors being removed from the flow scheme at a time for catalyst replacement or regeneration. This method requires a higher initial capital expenditure, involves a more complicated process flow and does not provide continuously uniform products. The use of single moving bed reactor provides a means to avoid the problems encountered in the prior art.

For this discussion, a moving bed reactor is defined as a reactor wherein a non-fluidized bed of catalyst is slowly transferred from one end of the reactor to the other end in a flow similar to plug flow of reactants by the addition of catalyst at the first end and removal at the second. The advantages of the moving bed system has led to its use in the light oil process of reforming as described in U.S. Pat. Nos. 3,479,090 and 3,647,680. This application of moving bed technology is carried out at low pressures of 100 – 300 psig. with all of the hydrocarbon maintained in a vapor phase. In the processing of heavy oils, the excessive temperatures required to vaporize the oil, especially at high pressures, results in the use of two phase flow. Dry catalyst is much more free flowing than catalyst coated with oil and catalyst movement has therefore not been a problem in these light oil plants.

The broad field of hydroprocessing is divided into three main subdivisions. The first is hydrotreating wherein material such as sulfur, nitrogen, and metals contained in various organic molecular structures are removed from the charge stock with very little molecular cracking. The second subdivision is hydrocracking, wherein a substantial part of the charge stock is cracked into smaller molecular weight components, such as in the production of a naphtha from a heavy distillate. Hydrorefining is between these two extremes and results in molecular changes to up to 10 percent of the feed together with impurity removal. Although there are many differences in the processing conditions or suitable catalysts and flow schemes for these different operations they are basically alike in most aspects and may in fact be performed simultaneously in one operation using different reactors or more than one catalyst in a single reactor.

Catalysts used in these processes are typically composed of a base metal, which is defined to be a metal selected from the group consisting of nickel, iron and cobalt, supported on an inorganic oxide carrier. Manufacture and composition of these catalysts is an art in itself and is not directly relevant to the practice of the process of this invention. A typical catalyst may contain from about 0.1 to 10 percent nickel or other metal or a combination of metals from the base metal group, in addition to other metals or oxides of metals such as molybdenum or vanadium. The base material in the catalyst will normally be a refractory inorganic oxide such as alumina, silica, zirconium, or boria, or combinations of any of these materials, particularly alumina in combination with one or more of the other oxides. The alumina is usually the predominant component with a weight ratio in the catalyst of from 1.5:1 to about 9:1 and preferably from about 1.5:1 to about 3:1 of alumina to other support materials. Inclusion of silica is a common method to increase the cracking activity of the catalyst since silica is an effective cracking catalyst by itself. Details of catalyst production are given in U.S. Pat. Nos. 3,525,684 and 3,471,399.

Processing conditions for any hydrorefining operation are determined by the charge stock, the catalyst used and the desired result of the process. A broad range of conditions includes a temperature of from 500° to 1000°F., a pressure of from 300 psig. to 4000 psig., and a liquid hourly space velocity of 0.5 to about 5.0. The liquid hourly space velocity is defined as the volume of the liquid charged to the reactor divided by the volume of the catalyst in the reactor. The exact reactor temperature required is determined by the initial activity and prior use of the catalyst. As a general rule, the operating pressure will increase with the boiling point of the material being processed. In all hydrotreating operations, hydrogen is circulated through the process at a rate of about 1000 to about 25,000 standard cubic feet per barrel of charge. This is to increase the vaporization of the oil resulting in better yield, to provide hydrogen for the formation of ammonia and hydrogen sulfide from the nitrogen and sulfur removed from the charge stock, and for the saturation of olefinic hydrocarbons and cracking of large complex molecule. Hydrogen consumed in this manner must be replaced at a rate equal to its consumption, which will vary from about 100 s.c.f./bbl. to about 1000 s.c.f./bbl. during hydrotreating and up to 3000 s.c.f./bbl. during hydrocracking. The production of hydrogen sulfide and ammonia makes it necessary to in some manner remove these compounds from the process on a continuous basis. Normal procedure to accomplish this is the injection of water into the reactor effluent to dissolve the salts formed from these impurities followed by cooling sufficient to form a water phase which is then decanted from a separation vessel. A second method is the treatment of the hydrogen recycle gas stream with a caustic solution to scrub out the $H_2S$. The performance of these two operations is well known to those skilled in the art and warrants no further explanation.

Catalyst withdrawn from the reaction zone used in processing a heavy hydrocarbon is unavoidably coated with an inherent residue of the hydrocarbon. As applied to this invention, the term heavy hydrocarbon is meant to mean any hydrocarbon mixture or compound having an initial boiling point in excess of 500°F. or any petroleum fraction which has a 50 percent distillation point in excess of 400°F. If the catalyst is removed by the use of the lock hopper type device, the void volume between the catalyst particles will also be filled with this hydrocarbon material. Its presence in these large amounts is undesirable because it increases the difficulty encountered in transporting the catalyst from the reactor and through the regeneration steps, and secondly, because in the regeneration process this hydrocarbon material must be burned off the catalyst and would produce undesirable amounts of heat. This hydrocarbon material may of course be allowed to drain off the catalyst, but due to the high viscosity of typical heavy hydrocarbons, this would be a slow and relatively inefficient method. Temperatures above 850°F. to 900°F. are undesirable in the regeneration of most catalysts and this is not much above the temperature of the catalyst in the reaction zone. Therefore, the carbon deposited on the catalyst is sufficient to generate enough heat to exceed these limitations and any liquid hydrocarbon is undesirable.

In a moving bed system which does not involve regeneration of the catalyst, the removal of the catalyst from the reactor in an oil covered state is a serious safety hazard. The hot, oil containing catalyst with its high metal and sulfur content is considered a dangerous substance capable of spontaneous ignition. For this reason, the use of the method of the present invention is also prudent when regeneration is not performed, prior to exposing the catalyst to air and may include both drying and cooling of the catalyst after the light hydrocarbon flush operation.

The improvement of the present invention resides in the use of a light hydrocarbon fluid or gas stream to flush the heavy hydrocarbon material from the catalyst, followed by drying the catalyst with a gas stream to remove the light hydrocarbon. The flushing operation may be performed immediately after the catalyst is withdrawn from the reaction zone, and the light hydrocarbon flush material may in fact be returned to the reaction zone through the passage way in which the catalyst was removed from the reaction zone.

The separation zone in which the flushing is performed would normally be outside of the main reactor vessel to allow its performance at a lower pressure than the reaction zone and because the cost of large high pressure vessels dictates that only absolute essentials are enclosed. However, it is possible that the separation zone may comprise a section of the main reactor below the point at which the reactor effluent is removed. An optional grating or perforated plate can be installed in the reactor as a physical separation between the two zones to hinder the downward flow of the heavy hydrocarbon and to induce better flushing or stripping in the separation zone. The light hydrocarbon flush stream or the stripping gas would pass upflow over the catalyst in this separation zone prior to its removal from the reactor to produce looser, more free flowing catalyst which is easier to transfer to a lock hopper. The degree of physical separation required to prevent large amounts of heavy hydrocarbon from flowing into the separation zone may be held to a minimum by the use of either a long and comparatively small diameter separation zone or by a larger continuous upward flow of the light hydrocarbon.

The light hydrocarbon used as the flush material may be any available stream which will readily dissolve the heavier hydrocarbon or the undesired residue and in hydroprocessing would preferably be a light naphtha such as a raw gasoline cut. It is readily apparent that when using a separation zone located with the reactor, it is unavoidable that the light flush material cannot be recycled until it is removed from the reaction zone effluent by fractionation. This increased demand on the fractionation system is one consideration in deciding on the location and design of the separation zone. A lock hopper enclosed zone would require either less flush material or less fractionation since only the entrained heavy hydrocarbon would contaminate the flush material. A second consideration to the location of the separation zone is the expected degree of difficulty to remove the catalyst from the reactor vessel. In the extreme situation of processing very heavy oils, such as vacuum tower bottoms, it may be desirable to flush the catalyst in both the reaction vessel and in a lock hopper after the catalyst is removed from the reaction vessel. Finally, the rate of catalyst turnover in the reactor is important since agglomeraton of the catalyst increases with its residence time. The degree to which carbon and other residue is built up will be much less with catalyst being recirculated every month than in the normal fixed bed operational periods of up to a year.

Depending on the type of material being processed in the reactor, the flush operation can be performed to varying degrees of completion in a lock hopper using a high velocity gas stream to strip the hydrocarbon from the catalyst. This alternative can be combined with a volatile hydrocarbon flush in a two step operation wherein the majority of the hydrocarbon is blown off the catalyst by a gas stream followed by the flush operation to dissolve the remaining hydrocarbon. With gas stripping, the fractionation requirements are lower than those discussed above since a smaller amount of the heavy hydrocarbon is dissolved in the flush material. If hydrogen or steam is used as the stripping gas, the stripping effluent is sent to a low pressure separator, commonly found on most hydroprocessing units, to recover the heavy hydrocarbon. When stripping is performed at the system pressure, the hydrogen or other gas may be charged to the lock hopper and allowed to escape via the catalyst withdrawal line into the reactor and thence to the high pressure separator. With lighter hydrocarbons, the gas stripping may be conducted solely in the reactor to a high degree of completion by using high temperature gas in sufficient quantities to vaporize the hydrocarbon and produce a dry catalyst in the reaction vessel.

I claim as my invention:

1. In a process in which a downward moving-bed of catalyst is utilized in a hydrocarbon conversion process having reactants present in a reaction zone as a liquid phase, the method of removing catalyst from the bottom of a reaction vessel which comprises the steps of:

a. passing a quantity of catalyst and entrained liquid phase reactants from a reaction zone and into a separation zone through a fluid flow controlling valve means;
b. flushing liquid phase reactants entrained with the catalyst from the separation zone by passing a light liquid hydrocarbon upwardly over the catalyst in the separation zone and through the valve means and into the reaction vessel;
c. removing the light liquid hydrocarbon from the reaction vessel through the same outlet means used to remove the liquid phase reactants;
d. closing the valve means; and,
e. drying the catalyst within the separation zone by passing a stream of gas over the catalyst.

2. In a process utilizing a downward moving-bed of catalyst to desulfurize a residual petroleum fraction which remains at least partially in a liquid state at reaction conditions, the method of transferring catalyst from the bottom of a reaction vessel which comprises the steps of:

a. passing a quantity of the contents of the reaction vessel, comprising liquid state residual petroleum and catalyst, from the reaction vessel and through a fluid flow controlling valve means and into a separation zone;
b. flushing liquid state residual petroleum from the separation zone by upwardly passing a light liquid hydrocarbon through the separation zone and valve means and into the reaction vessel;
c. closing the valve means; and,
d. drying the catalyst within the separation zone by passing a stream of gas over the catalyst.

* * * * *